US012779483B2

(12) United States Patent
Fricker et al.

(10) Patent No.: US 12,779,483 B2
(45) Date of Patent: Nov. 3, 2026

(54) MIXING DEVICE FOR COSMETICS

(71) Applicant: LA PRAIRIE GROUP AG, Volketswil (CH)

(72) Inventors: Tobias Fricker, Constance (DE); Judith Fiedler, Rafz (CH); Wolfgang Naehr, Zurich (CH)

(73) Assignee: LA PRAIRIE GROUP AG, Volketswil (CH)

( * ) Notice: Subject to any disclaimer, the term of this patent is extended or adjusted under 35 U.S.C. 154(b) by 674 days.

(21) Appl. No.: 17/753,525

(22) PCT Filed: Aug. 18, 2020

(86) PCT No.: PCT/EP2020/073044
§ 371 (c)(1),
(2) Date: Mar. 7, 2022

(87) PCT Pub. No.: WO2021/047861
PCT Pub. Date: Mar. 18, 2021

(65) Prior Publication Data
US 2022/0331825 A1 Oct. 20, 2022

(30) Foreign Application Priority Data
Sep. 9, 2019 (DE) ..................... 10 2019 213 645.1

(51) Int. Cl.
*B05B 11/10* (2023.01)
*A45D 40/26* (2006.01)
*B01F 25/452* (2022.01)
*B01F 33/501* (2022.01)
*B01F 35/75* (2022.01)
*B01F 101/21* (2022.01)

(52) U.S. Cl.
CPC .......... *B05B 11/1081* (2023.01); *A45D 40/26* (2013.01); *B01F 25/4521* (2022.01); *B01F 33/50111* (2022.01); *B01F 35/7547* (2022.01); *A45D 2200/058* (2013.01); *B01F 2101/21* (2022.01)

(58) Field of Classification Search
CPC ............ B05B 11/1081; B01F 33/50111; B01F 35/7547; B01F 2101/21
See application file for complete search history.

(56) References Cited

U.S. PATENT DOCUMENTS 3,856,270 A 12/1974 Hemker
5,492,655 A * 2/1996 Morton ................. B29B 7/7605 261/DIG. 26
6,379,035 B1 4/2002 Kubo et al.
9,446,425 B2 9/2016 Bibette et al.
11,491,451 B1 * 11/2022 Androsch ........... B01F 35/3202
(Continued)

FOREIGN PATENT DOCUMENTS

DE 10126267 A1 12/2002
DE 20305103 U1 7/2003
(Continued)

*Primary Examiner* — Jeremy Carroll
(74) *Attorney, Agent, or Firm* — Abel Schillinger, LLP

(57) ABSTRACT

The invention relates to a mixing device for mixing one or more cosmetic preparations in a dispenser with a dispensing opening (8). The mixing device comprises at least two mixing plates (1) which comprise one or more passages (2), the diameter thereof tapering in direction of the dispensing opening.

19 Claims, 4 Drawing Sheets

(56) References Cited

U.S. PATENT DOCUMENTS

| | | | | |
|---|---|---|---|---|
| 2002/0064087 | A1* | 5/2002 | Catalfamo | B01F 25/4523 366/337 |
| 2011/0284584 | A1* | 11/2011 | Velazquez | B05B 7/0037 206/524.1 |
| 2011/0284587 | A1* | 11/2011 | Galazka | B05B 11/043 222/190 |
| 2015/0209810 | A1 | 7/2015 | Bibette et al. | |
| 2018/0154319 | A1* | 6/2018 | Richardson | B01F 33/3017 |
| 2020/0164323 | A1* | 5/2020 | Müller | B01F 35/513 |
| 2021/0267348 | A1* | 9/2021 | Lee | A45D 40/26 |
| 2022/0331825 | A1* | 10/2022 | Fricker | B05B 11/1081 |

FOREIGN PATENT DOCUMENTS

| | | | |
|---|---|---|---|
| EP | 0754492 | A2 | 1/1997 |
| EP | 1036588 | A1 | 9/2000 |
| WO | 2014027039 | A1 | 2/2014 |

* cited by examiner

MIXING DEVICE FOR COSMETICS

BACKGROUND OF THE INVENTION

Field of the Invention

The invention is a mixing device, in particular for cosmetic dispensers.

Discussion of Background Information

Dispenser or dosing dispenser is a term for various manual, semi-automatic or automatic discharge devices.

In cosmetics, there is widespread use of pump devices and dispensers, in particular composed of plastic.

A distinction is made, according to the manner in which the product exits, between compressed air-operated pump bottles (or atomizers), in the case of which the product, by way of the positive pressure of a compressed air that prevails in the bottle, is finely divided into an aerosol and emitted under pressure, and airless pump bottles or dispensers, in the case of which the product, while remaining in liquid form, is pressed out of the exit nozzle by way of the inwardly moved plunger. In comparison with an atomizer, a dispenser has the advantage that no compressed air is required.

Further dispenser systems are known in the prior art. So-called airless systems with drawing plungers, in particular, are widely used.

Dispenser systems with drawing plungers are highly popular, in particular in the cosmetics industry. They have in particular the following advantages:

- removed filling volume is not replaced by air, and consequently use for oxidation-sensitive preparations is also possible,
- outer form is maintained during the entire period of usage,
- container is not pressurized, and
- simple dosing is possible.

A significant disadvantage is the partly complicated structure in comparison with other packaging means, such as tubes or jars.

The pumps here are very widely used and are used for all types of liquid and gel-like, not excessively solid soaps, creams, lotions, etc. Here, the pump is simply screwed to a PET or PE bottle and the filling material is pumped upward via a tube. Pumping is realized simply by mechanical downward pressing of the pump body. The pump body is then pulled upward again by a high-grade steel spring, which results in the formation of a vacuum which sucks the filling material into the pump body via the tube. Balls composed of plastic or glass that seal off the pump body toward the tube and toward the exit opening serve as valves. At the same time, during the pumping process, channels permitting the inflow of air into the container are opened, it otherwise being the case that the bottle would constrict and the delivery power of the pump would be adversely affected.

Problems arise as soon as the filling material or one of the preparations to be mixed has different phases. Consequently, visual differentiation is possible and also separation of incompatible ingredients/active substances is possible. However, problems concerning homogeneous dispensing, which is then nonetheless desired, also arise therefrom.

For example, particulate constituents, balls, bubbles or other forms are contained in the preparation. Some constituents are partially unstable in the preparation surroundings, and so are introduced encapsulated. Prior to application, the capsules here must be reduced in size and crushed so as to be able to be dispensed or in order that the encapsulated active ingredient can be released and have an effect.

It is desired to provide a mixing system by way of which preparations having different phases can be mixed.

SUMMARY OF THE INVENTION

The invention is a mixing device for liquid or flowable materials, in particular for cosmetic preparations such as cream, ointments, gels, emulsions. The mixing device comprises at least two mixer plates which are spaced apart from one another and which each have multiple passages which narrow in a flow direction.

The mixing device according to the invention makes possible the mixing of one or multiple preparations in a dispenser with a discharge opening.

The mixing device comprises at least two mixer plates which each have one or multiple passages. The diameters of the passages narrow in the direction of the discharge opening, that is to say in the flow direction during dispensing of the preparation. The two or multiple mixer plates are arranged one after the other in the direction of the discharge opening, so that the preparation can flow through one mixer plate after the other.

Advantageously, four mixer plates are arranged one after the other in the direction of the discharge opening of the dispenser. Ideally, all the diameters of the passages at the flow exit of a mixer plate are equal. However, advantageously, the diameters of the passages at the flow exit of the mixer plates arranged one after the other become ever smaller in diameter toward the discharge opening. That is to say, the mixer plate at the discharge opening preferably has the passages with the smallest diameters.

Thus, for example, the mixer plate which is flowed through first by the preparations to be mixed has the passages with the largest diameters at the flow exit. Then, the mixer plate flowed through subsequently has passages whose diameters at the flow exit are smaller.

Also according to the invention are dispensers comprising one or multiple mixing devices according to the invention, advantageously dispensers for cosmetics.

The dispensers then comprise one or multiple preparations to be mixed, wherein at least one preparation comprises two or multiple phases.

In particular, the preparations to be mixed are a cosmetic preparation which, at least at room temperature, is flowable, pumpable and/or pasty. It is naturally advantageous for said preparations to be flowable, pumpable and/or pasty in a temperature range of −50° C. to 50° C.

The size of the spacing between the mixer plates is advantageously 0.1 to 1 mm, ideally in the range of 0.3 to 0.6 mm.

The mixer plates advantageously have a thickness of 0.05 to 1.5 mm, ideally in the region of 0.5 mm. The passages/through-openings have a diameter of 0.1 to 10 mm, ideally in the range of 0.2 to 1 mm, in particular 0.3 to 0.6 mm, at the flow exit. The passages, in the flow direction, narrow correspondingly to this relatively small diameter at the exit.

Owing to their narrowing, the passages preferably have the shape of a cone segment. The height of the cone segment, of the passage, corresponds to the thickness of the mixer plate, and the specified diameter of the cone segment corresponds to the diameter of the passage at the flow exit.

At the flow entry of the passage, the diameter may be selected in a relatively arbitrary manner, it being essential according to the invention only that the diameter narrows over the height of the passage/thickness of the mixer plate.

The narrowing from the flow entry to the flow exit of the passage may occur in a linear manner, such as in the case of a cone segment, in a curved manner or in steps. A narrowing takes place according to the invention if the diameter of the passage at the flow entry is larger than the diameter of the passage at the flow exit.

The mixer plates preferably consist of plastic.

Advantageously, 4 mixer plates are spaced apart one behind the other.

The mixing device according to the invention is used in dispensers, pumps, mixing systems or the like, in particular for cosmetics.

For example, a dispenser comprises two storage containers in which two different preparations are contained, which preparations however are to be discharged in a mixed state.

Via a pump device, the two preparations are pumped in a parallel manner via ascending tubes to the discharge opening of the dispenser. The mixing device according to the invention can then simply be inserted before the discharge opening of a dispenser.

The mixing device according to the invention proves to be advantageous with the mixing of two or multiple preparations in particular if at least one of these preparations comprises particulate constituents which, prior to being applied to skin, are to be broken up, split or crushed.

A preparation comprising particulate constituents, in particular spherical particles, advantageously comprises an outer flowable gel-like phase, which possibly contains typical auxiliary substances and additives in cosmetics, and an inner particulate phase, which comprises substantially spherical particles whose mean diameter is selected from the range of 0.1 to 10 mm, preferably 0.2 to 7.5 mm.

The particles are advantageously thixotropic in order to ensure complete dissolution during the mixing process. Moreover, the particles should have a yield point in order to avoid dissolution in the suspended medium.

This means, advantageously, that there must be a similar osmotic pressure between inner medium and outer medium in order to avoid uncontrolled swelling/dissolution of the particles over time.

The preparations to be mixed are therefore flowable to pasty and are advantageously made up of two or multiple phases.

If two or multiple different preparations are to be mixed, at least one of the preparations to be mixed has two or multiple phases.

Having multiple phases means that at least two phases exist within a preparation. The phases are distinguished by one or multiple properties, such as viscosity, density, lipophilicity and/or state of matter. Consequently, for example, typical flowable emulsion-based preparations in which particulate constituents are contained are comprised.

The emulsion forms one phase, the particles form the other phase. The particles in the preparation, which contain for example an active substance or dye, may in this way be stored in a visually attractive manner in a transparent dispenser. During dispensing, the preparation flows through the mixing device according to the invention and at the end there is dispensed a preparation with which the active substance/dye achieves the desired effect on skin or the desired color effect.

It is also preferable for two different preparations to be mixed, as will be explained by way of example below in the examples.

An embodiment according to the invention will be described below.

A cosmetic dispenser comprises for example two chambers in which there is situated in each case one cosmetic preparation. For example, one chamber comprises biopolymer balls distributed in a gel liquid and an emulsion is in the second chamber. Both preparations can be pumped upward to the outlet via a tube. Pumping is realized simply by mechanical downward pressing of the pump body, which is attached to the cosmetic dispenser. The pump body is then pulled upward again for example by a high-grade steel spring, which results in the formation of a vacuum which sucks the filling material, the two preparations, into the pump body via the tube. Balls composed of plastic or glass that seal off the pump body toward the tube and toward the exit opening serve as valves.

The mixing device according to the invention is situated in the flow path before the outlet, the discharge opening of the dispenser, such that no preparation can be pressed past the edge of the mixer plates.

The mixer plates are advantageously delimited at the edge by a mixer attachment.

The mixer attachment advantageously comprises the respective preparation entries and surrounds the mixer plates at the edge such that the preparations can flow to the discharge only through the mixer plates.

When pumping, the two pumps of the dispenser are actuated simultaneously.

The two preparations are pressed into the mixing device by way of the pump stroke. The preparations flow through the passages of the mixer plates from below. Since the passages narrow in the flow direction toward the flow outlet, the biopolymer balls break and mixing of the broken ball constituents with the second preparation, the emulsion, is realized. In the mixing device, there is formed a gel cream, which is then discharged.

If, then, according to the invention, preferably two or multiple mixer plates are arranged one behind the other, even better mixing is achieved. Likewise, it is preferable for two or multiple mixer plates to have passage openings which in each case become ever smaller in diameter toward the outlet.

Consequently, as far as the end outlet, even particles not yet reduced in size will be crushed, and the mixing is in turn improved.

Advantageously, each mixing plate comprises multiple passages and, advantageously, almost the same number of passages.

The passages of the mixer plate which is flowed through first by the preparations preferably have a larger diameter at the flow exit than the passages of the mixer plate flowed through subsequently.

Advantageously, multiple, ideally 4, mixer plates are arranged one behind the other.

Then, firstly the end diameters of the passages become smaller from mixer plate to mixer plate and, since the passages narrow in the flow direction according to the invention, the mixing is thus further optimized from plate to plate.

The mixing is optimized toward the mixing by the static mixing system plus the force to be used in the application of the pressure of the pump button/mechanism.

The pump discharge amount is advantageously 0.1 to 0.5 g, in particular in the range of 0.15 to 0.25 g, per pump stroke.

DETAILED DESCRIPTION OF EXEMPLARY EMBODIMENTS OF THE INVENTION

Figure 1:
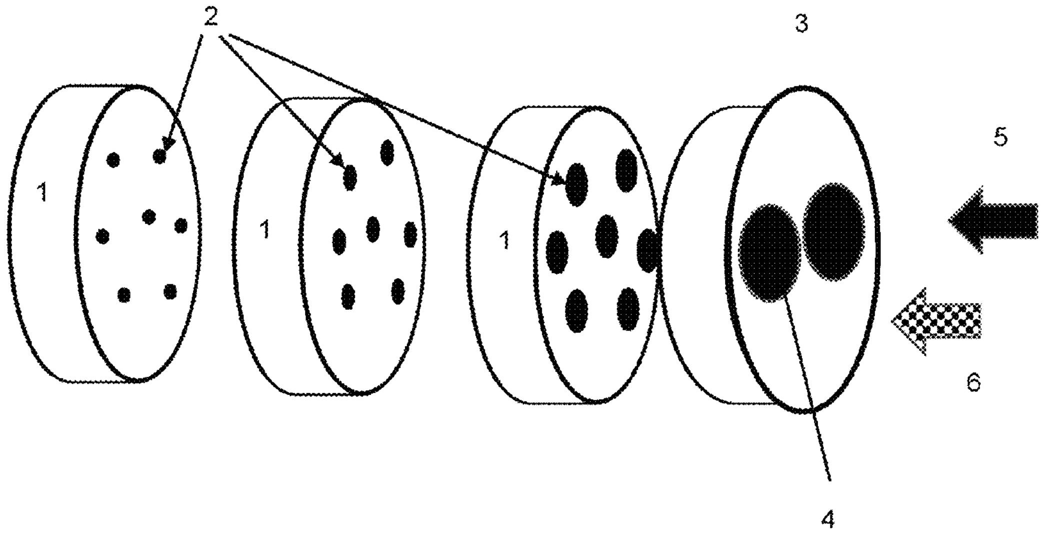
FIG. 1 shows a sketch and illustration of a mixing device according to the invention with three mixer plates in which multiple passages are provided.

FIG. 1 depicts a sketch and illustration of a mixing device according to the invention with 3 mixer plates (1) in which multiple passages (2) are provided. The mixing device comprises at the preparation entry a mixer attachment (3) with two openings (4) through which the two preparations (5, 6) are pressed into the mixing device.

Figure 2:
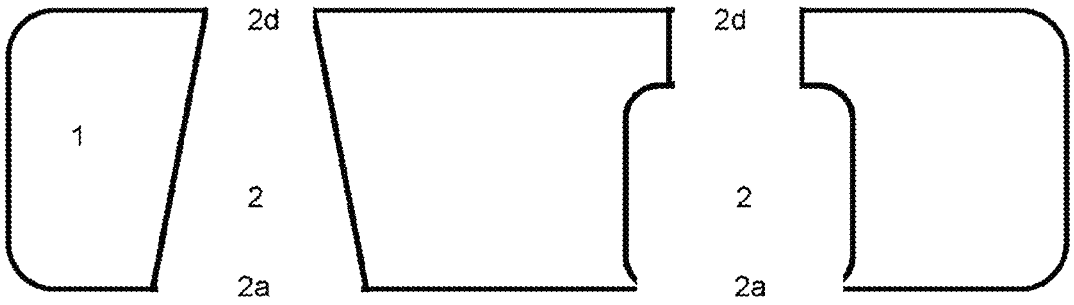
FIG. 2 shows a mixer plate with two geometrically different passages.

FIG. 2 shows a mixer plate (1) with two geometrically different passages (2).

The preferred shape of a cone segment is shown on the left. Another possible shape is shown on the right. For all possible shapes, it is essential that the diameter of the passages (2) at the flow exit (2*d*) is smaller than the diameter of the passages at the flow entry (2*a*).

Figure 3:
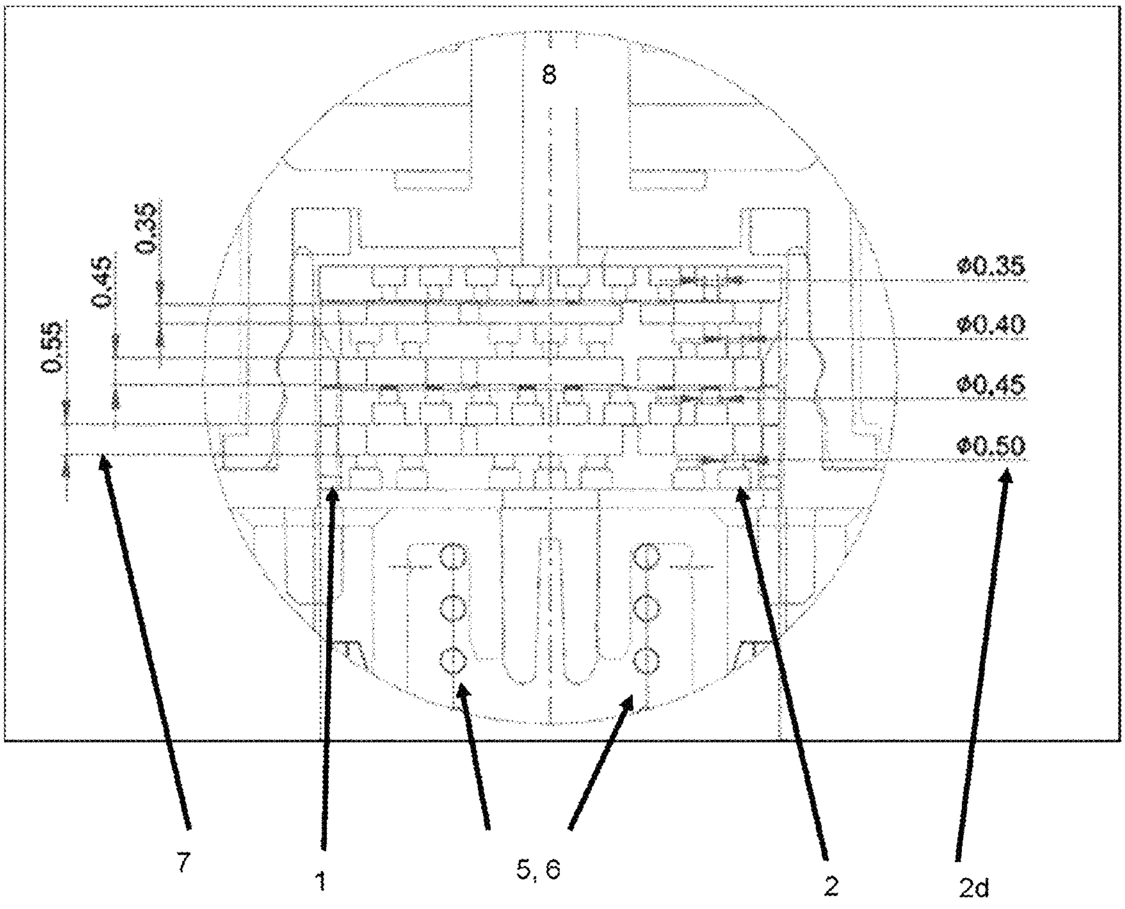
FIG. 3 shows four mixer plates one above the other in a dispenser.

FIG. 3 shows 4 mixer plates (1) one above the other in a dispenser. The preparations (5, 6) are pressed into the mixer plate (1) from below. Said preparations flow through the passages (2) of the first mixer plate. The passages (2) of the first mixer plate have a diameter of 0.5 mm at the flow exit (2*d*).

The second mixer plate has a spacing (7) of 0.55 mm from the first mixer plate.

The passages (2) of the second mixer plate have a diameter of 0.45 mm at the flow exit (2*d*), the passages (2) of the third mixer plate have a diameter of 0.4 mm at the flow exit (2*d*), and the passages (2) of the fourth mixer plate have a diameter of 0.35 mm at the flow exit (2*d*).

Consequently, there is realized not only narrowing within the respective passages (2) of a mixer plate (1) but also narrowing from one mixer plate to the next, this always being in the flow direction toward the discharge (8).

Figure 4:
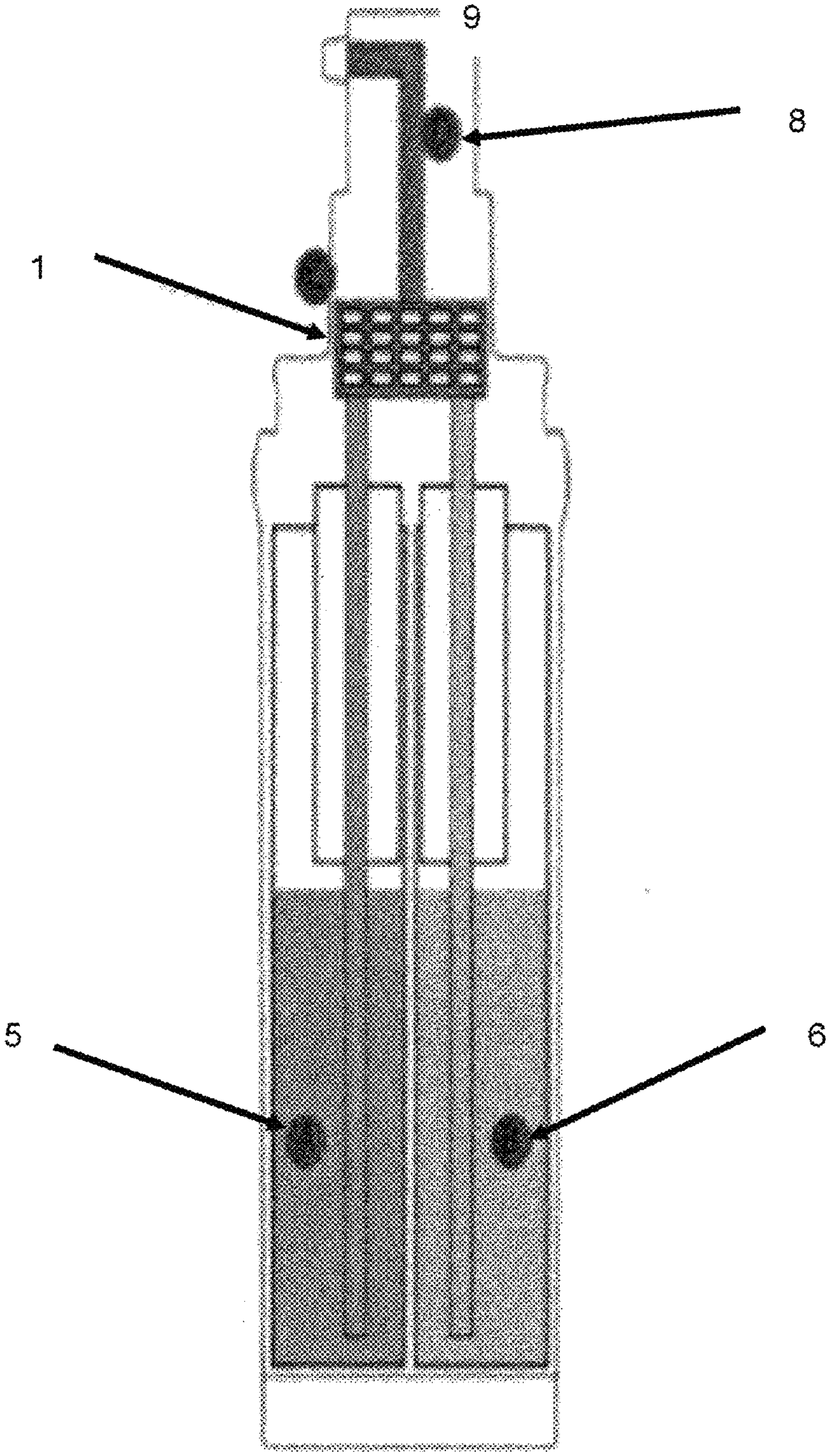
FIG. 4 shows a dispenser with four mixer plates.

FIG. 4 shows a dispenser (9) with 4 mixer plates (1). The preparations (5, 6) are transported to the exit (8) of the dispenser through the mixer plates (1) via the ascending tube.

KEY

Mixer plate 1
Diameter/opening of the mixer plate 2
Diameter of the passage of the mixer plate at the flow entry 2*a*
Diameter of the passage of the mixer plate at the flow exit 2*d*
Mixer attachment 3
Opening/passage of the mixer attachment 4
Preparation to be mixed 5, 6
Spacing of the mixer plates 7
Discharge of the dispenser 8
Dispenser 9

What is claimed is:

1. A mixing device for mixing one or multiple preparations in a dispenser having a discharge opening, wherein the mixing device comprises at least two mixer plates which each comprise one or more passages whose diameters narrow in a direction of the discharge opening, the mixer plates being spaced apart and arranged one after the other in the direction of the discharge opening, diameters of the passages of the mixer plates decreasing toward an outlet.

2. The mixing device of claim 1, wherein four mixer plates are arranged one after the other in the direction of the discharge opening.

3. The mixing device of claim 1, wherein a spacing between the mixer plates is from 0.1 mm to 1 mm.

4. The mixing device of claim 3, wherein the spacing between the mixer plates is from 0.3 mm to 0.6 mm.

5. The mixing device of claim 1, wherein a thickness of the mixer plates is from 0.05 mm to 1.5 mm.

6. The mixing device of claim 5, wherein the thickness of the mixer plates is from 0.4 mm to 0.6 mm.

7. The mixing device of claim 1, wherein the passages have a diameter of from 0.1 mm to 1 mm at a flow exit.

8. The mixing device of claim 7, wherein the passages have a diameter of from 0.2 mm to 1 mm at the flow exit.

9. The mixing device of claim 7, wherein the passages have a diameter of from 0.3 mm to 0.6 mm at the flow exit.

10. The mixing device of claim 1, wherein all diameters of the passages at a flow exit of a mixer plate are the same.

11. A dispenser, wherein the dispenser comprises one or more mixing devices according to claim 1 and one or more preparations, at least one of the one or more preparations comprising at least two phases.

12. The dispenser of claim 11, wherein the at least one preparation comprising at least two phases is a cosmetic preparation.

13. A method of mixing one or more preparations at least one of which has at least two phases, wherein the method comprises mixing the one or more preparations with the mixing device of claim 1.

14. The method of claim 13, wherein the at least one preparation having at least two phases is a cosmetic preparation.

15. The method of claim 13, wherein the at least one preparation having at least two phases comprises particulate material.

16. The dispenser of claim 11, wherein the at least one preparation having at least two phases comprises particulate material.

17. The dispenser of claim 11, wherein the dispenser comprises two chambers in each of which a cosmetic preparation is present.

18. A mixing device for mixing one or multiple preparations in a dispenser having a discharge opening, wherein the mixing device comprises four mixer plates which each comprise one or more passages whose diameters narrow in a direction of the discharge opening, diameters of the passages of the mixer plates decreasing toward an outlet and the mixer plates being spaced apart and arranged one after the other in the direction of the discharge opening, and wherein a spacing between the mixer plates is from 0.1 mm to 1 mm, a thickness of the mixer plates is from 0.05 mm to 1.5 mm, and the passages have a diameter of from 0.1 mm to 1 mm at a flow exit.

19. A dispenser, wherein the dispenser comprises one or more mixing devices according to claim 18 and at least two preparations, at least one of the at least two preparations comprising at least two phases.

* * * * *